United States Patent

[11] 3,585,389

[72] Inventors Thomas G. Roberts;
 Charles M. Rust, both of Huntsville, Ala.
[21] Appl. No. 881,028
[22] Filed Dec. 1, 1969
[45] Patented June 15, 1971
[73] Assignee The United States of America, as represented by the Secretary of the Army

[54] SIMPLE SOLID-ELECTROLYTE GAMMA-RAY AND RELATIVISTIC-CHARGED PARTICLE DOSIMETER
8 Claims, 4 Drawing Figs.

[52] U.S. Cl. ..................................................... 250/83, 250/83.3
[51] Int. Cl. ...................................................... G01t 1/04
[50] Field of Search ........................................... 250/83 CD, 83.3

[56] References Cited
UNITED STATES PATENTS
2,708,242 5/1955 Ruben .......................... 250/83 X
3,030,510 4/1962 Reeder ......................... 250/83 X
3,179,581 4/1965 Lewin et al. .................. 250/83 X Primary Examiner—Archie R. Borchelt
Attorneys—Harry M. Saragovitz, Edward J. Kelly, Herbert Berl and Harold W. Hilton ABSTRACT: A gamma-ray and relativistic charge particle detector and method for measuring the amount of radiation passed through the detector. The detector is a dosimeter comprising a plurality of equally spaced batteries disposed to form a series of columns and rows within a plane having vertical and horizontal rectangular coordinate axes. The batteries, radiation sensors, can be repeatedly charged and discharged with very little characteristic change in the discharge curve. The batteries have a solid electrolyte and a low voltage output. Radiation passing through the electrolyte causes partial ionization of the electrolyte, which reduces the battery terminal voltage in proportion to the amount and type of radiation passed therethrough. Before and after being exposed to radiation, the batteries are placed in a test stand and the individual battery voltages are simultaneously measured and recorded. A change in voltage across the battery terminals, after exposure to a known type of radiation, is proportional to the radiation passed therethrough. Thus, differential voltage, displayed as a contour map or picture of the radiation pulse, is representative of the radiation intensity passing through the detector.

PATENTED JUN 15 1971 3,585,389

Thomas G. Roberts
Charles M. Rust,
INVENTORS.
Harry M. Saragovitz
BY Edward J. Kelly
Herbert Berl
Harold W. Hilton 3,585,389

SIMPLE SOLID-ELECTROLYTE GAMMA-RAY AND RELATIVISTIC-CHARGED PARTICLE DOSIMETER

BACKGROUND OF THE INVENTION

Dosimetric instruments are designed for measurement of both random radiation and planned radiation. These include the intermittent or continuous radiation of a sample with a selected type of radiation, the random radiation encountered in handling radioactive material, and unexpected exposure to various radiation sources.

The radiation detector or dosimeter converts ionizing radiation into recordable energy such as electrical or chemical variations. A few of the detectors available in prior art devices include photographic films, chemical devices and calorimeters, which detect radiation such as X-rays, gamma and beta rays.

Quantitative measurements of high-intensity, short-duration pulses of gamma-rays or electrons in the million-electron-volt (mev.) range are very difficult, especially when the duration of these pulses are in the nanosecond range. Phototubes with proper shielding are currently being used to measure the intensity of gamma-ray pulses but these are usually quite large because of the shielding required and each tube requires the use of an expensive traveling wave oscilloscope. Thus little in the way of spatial resolution may be obtained and the space behind the detector is shielded from the radiation pulse, precluding use thereof.

Some chemicals which change luminosity properties or are stimulated to luminousness when radiated are also used with gamma-ray pulses. Some spatial resolution may be obtained with these chemicals, but each one must be collected and expensive equipment must be utilized in time-consuming measurements.

For electron pulses, calorimeter arrays are used to measure beam profiles and the total energy content of beams. Stacked thin sheets of metal are used as a calorimeter to measure the rate of loss of energy from which the energy of the electrons is calculated. Certain colored plastics which have the property of changing when radiated are sometimes used with electron beams. These plastics must be calibrated with the calorimeters, and the plastic is not produced for this purpose and there are large variations even within the same plastics.

SUMMARY OF THE INVENTION

The apparatus of the present invention is a device for detecting and measuring the amount of high-intensity, short-duration pulses of gamma-rays or other ionizing radiation. A detector includes a series of rechargeable, solid-electrolyte batteries that are thin enough to allow pulses of gamma-rays or electrons to be monitored without appreciable attenuation thereof. The batteries are arranged in a plane for insertion between the radiation source and the sample to be radiated and are small enough to allow good spatial resolution to be obtained. They are fairly chemically inert and can be mounted in any position. Radiation impinging on the detector causes some solid-electrolyte ionization in each battery that is proportional to the intensity of radiation. The ionization results in partial discharge of the batteries, thus decreasing the terminal voltage of each battery. The decreased terminal voltage is recorded and compared with the voltage prior to radiation sampling to display the radiation intensity as a function of the change in voltage across the batteries. For a known type of radiation, the change in voltage is indicative of the amount of radiation passed therethrough.

DESCRIPTION OF THE PREFERRED EMBODIMENT

Figure 1:
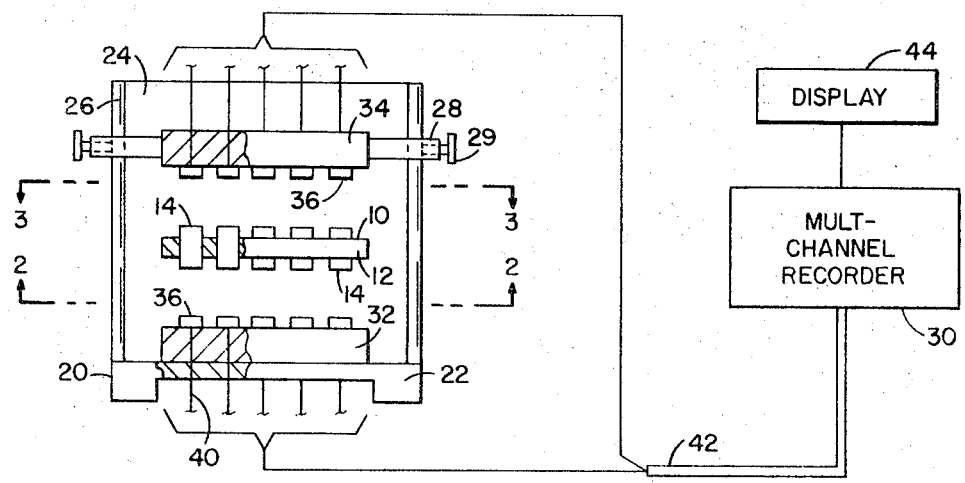
FIG. 1 is a plan view of a preferred embodiment of the invention.
Figure 2:
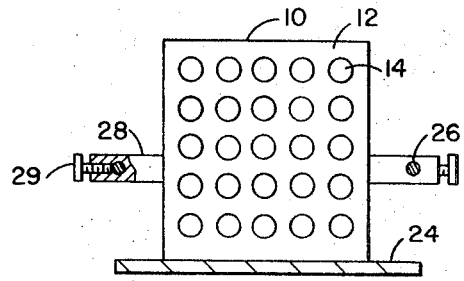
FIG. 2 is a view along the line 2–2 of the embodiment of FIG. 1.
Figure 3:
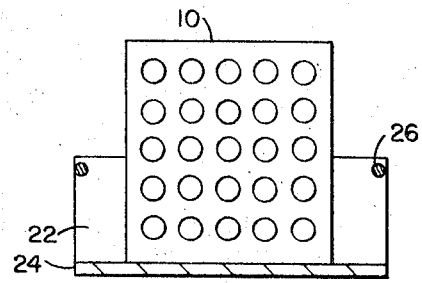
FIG. 3 is a view along the line 3–3 of the embodiment of FIG. 1.

Referring now to the drawings wherein like numerals represent like parts in all figures, there is disclosed a preferred embodiment of the invention in FIGS. 1, 2 and 3. A dosimeter 10 is mounted in a test jig 20 for electrical connection to a multichannel recorder 30. Dosimeter 10 includes a support structure 12 for holding a plurality of batteries 14 therein. Batteries 14 are disposed in a group of adjacent columns which form a series of evenly spaced columns and rows within a plane. Test jig 20 includes a vertical support structure 22 attached to a bed 24 and to a pair of arms 26 extending over bed 24. A slidable member 28 of jig 20 can be moved along arms 26 and fixed in a desired position by screws 29. Support plates 32 and 34 are respectively carried by plate 22 and member 28. A plurality of electrical contacts 36 are carried by plates 32 and 34 and are aligned in parallel planes that are parallel with batteries 14 and support structure 12 so that an electrical contact 36 is on either side and approximately coaxial with each battery 14. Electrical leads 40 from each contact 36 are brought together into a cable 42 for connection to multichannel recorder 30. The recorded voltage levels can then be coupled to a graphical or visual display 44 for indicating the terminal voltage of each battery. Visual display 44 may be a component part of recorder 30 or a remote display.

Figure 4:
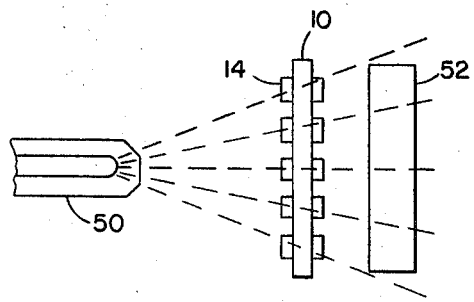
FIG. 4 is a view of a detector and sample being radiated.

In FIG. 4, dosimeter 10 is placed between a sample or object 52 that is to be radiated and a radiation source 50. Source 50 is activated to stimulate emission of a known type of radiation which passes through dosimeter 10 to reach the sample.

Batteries 14 can be individually charged to a selected low voltage or for a prescribed period of time. Also, by removing recorder 30 and connecting a charging source to cable 42, a plurality of batteries can be simultaneously charged. Battery support structure 12 can be a thin plastic sheet and the batteries can be similar in shape and size to a small coin, although these components are not limited to the structure as described.

In operation, a plurality of batteries 14 are charged to a low voltage by conventional means. The charged batteries in dosimeter 10 are inserted in test jig 20. Member 28 and plate 34 are pushed toward plate 32 bringing the contacts 36 of plates 32 and 34 against the opposing surfaces of each battery 14. Jig 20 is secured and recorder 30 is activated to measure and record the open circuit voltage of each battery 14. The recorder is then deactivated and dosimeter 10 is removed from jig 20. Dosimeter 10 is placed in front of sample 52 and the radiation source is pulsed. Radiation passing through dosimeter 10 causes some ionization of the solid electrolyte therein in proportion to the amount of radiation passed therethrough. The batteries are partially discharged because of the ionization which causes a decrease in the battery output voltage level. Dosimeter 10 is replaced in test jig 20 and the battery terminal voltages are again measured and recorded by recorder 30. The difference in the two voltages measured across each battery is then displayed in any convenient form to give the intensity of radiation as a function of battery position.

Regardless of the charge across each battery 14, passing of a known type of radiation therethrough causes the charge to be reduced in proportion to the radiation. Therefore, the batteries can be used repeatedly until a minimum level of acceptability is reached, without recharging after each exposure and measurement.

Assuming ideal conditions, a plurality of batteries charged to the same low voltage "X" will have the voltage "X" recorded before exposure to radiation. If the sensors or batteries are arranged in a plane having rectangular coordinate axes and the radiation source is aligned with and directed toward the "0" or center of the axes as shown in FIG. 4, the centermost sensor (battery) receives the greatest radiation with gradually lesser amounts received therearound. The sensors are then rechecked to record the voltage changes.

thereacross. Graphically, a three-dimensional cone is produced, terminating at one end in the relatively flat surface bounded by the voltage level "X" and terminating at the other end in a peak aligned with and approaching "0." Variations from this ideal situation obviously exist wherein the battery voltages are not identical initially for all batteries and radiation is directed toward the detector from various locations, for example. However, the differential voltage measured across each battery terminal is the critical information that indicates the amount of radiation passed through the battery. Each battery contributes a voltage differential which determines the radiation contour map or density of radiation measured.

Obviously, the sensors can be arranged other than in a rectangular coordinate system. For example, a series of radii lying in a plane about a given center point can have sensors at various locations on each circle around the point.

The batteries employed in dosimeter 10 are similar to those described in an article in IEEE Transactions on Aerospace and Electronic Systems, Volume AES-I, Number 3, Dec. 1965, pages 290—296. The article is entitled "Thin-Film Rechargeable Solid-Electrolyte Batteries."

Batteries 14 have long and stable shelf life, therefore the output voltage of each battery is constant in time and each battery is insensitive to temperature changes. Because of the solid electrolyte they can be mounted in any convenient position. A typical battery can be 0.025 centimeters thick and 1¼ centimeters in diameter or less in size. The batteries do not have to be mounted in a plastic holder, but can be glued or otherwise attached to the sample. The batteries can be mounted in badges or small holders worn by individuals and thereby provide means of measuring the radiation dose that an individual has received while in a radiation area, or they can be placed so that they monitor the radiation in a given location.

When the batteries are placed in a given location they can be periodically checked as previously described or they can be electrically connected to trip an alarm or activate a controlling circuit when the voltage level drops below a preselected level due to radiation in the area. In this capacity a typical electrical circuit can include a resistance bridge network with the batteries connected in series or parallel in a null circuit across the bridge. As radiation changes the battery terminal voltage, the null is lost. A potentiometer or other sensor in the null branch responds to the change in potential thereacross or current therethrough to activate heavy-duty electrical equipment, such as a relay, which in turn may sound an alarm, shut off operating machinery, or initiate other desirable control steps. Placing the batteries in a null condition eliminates any current drain therefrom and in essence places them in a shelf storage state until radiation changes the potential thereacross and breaks the null.

Similarly, a radiation-sensing battery can be connected in series with a current-sensing meter to activate an alarm circuit. A typical circuit can include a direct current power source having a large resistance potentiometer connected thereacross. One side of the potentiometer can be connected to the meter and the variable arm connected to the battery sensor. The large resistance of the potentiometer allows only little current to drain from the source. The battery sensor is connected in opposition to the IR drop across the variable arm of the potentiometer. The potentiometer is adjusted to read a null on the meter, indicating zero current flow. Radiation changes within the sensor cause an imbalance to occur and current flow through the meter. At a preselected level of current, the meter activates following circuitry.

We claim:

1. A gamma-ray and relativistic charge particle dosimeter comprising a plurality of radiation sensors arranged in a plane, each of said sensors having a known electrical potential thereacross and disposed to exhibit a change in said potential in response to passage of radiation therethrough.

2. A dosimeter as set forth in claim 1 wherein said radiation sensors are direct current batteries.

3. A dosimeter as set forth in claim 2 wherein said batteries are rechargeable, solid-electrolyte and low-voltage-producing batteries wherein the solid electrolyte is partially ionized by radiation passing therethrough to reduce the battery terminal or output voltage in proportion to the radiation passed therethrough.

4. A dosimeter as set forth in claim 3 wherein said batteries are disposed to form a plurality of columns and rows in a plane having vertical and horizontal rectangular coordinate axes.

5. A dosimeter as set forth in claim 4 wherein said plurality of batteries include at least four batteries, and each of said batteries have a volume less than one-tenth of a cubic centimeter.

6. A method for measuring high-intensity, short-duration pulses of gamma radiation and relativistic charged particles comprising the steps of:
    a. measuring the open circuit voltage level across each one of a plurality of radiation sensors,
    b. subjecting the radiation sensors to an unknown amount of radiation from a known type of radiating source,
    c. measuring the open circuit voltage level across each radiation sensor, and
    d. comparing any change in the remeasured voltage from that of the measured voltage of each sensor and thereby determining the amount of radiation passed through each of said sensors as a proportion of the change in voltage thereacross.

7. The measuring method as set forth in claim 6 and further comprising the steps of:
    a. simultaneously measuring and remeasuring said sensors voltage level by electrically connecting each of said sensors simultaneously to a multichannel recorder.
    b. placing said plurality of radiation sensors in a plane between said radiation source and a sample to be radiated and adjacent said sample prior to subjecting radiation thereto for determining the radiation received by said sample, and
    c. displaying said compared voltage differences from each sensor in a display showing the relative position of each sensor with respect to adjacent sensors and the amount of open-circuit voltage change for each irradiated sensor,.

8. The measuring method as set forth in claim 7 and further comprising the steps of:
    a. disposing said sensors to form a plurality of columns and rows in a plane having vertical and horizontal rectangular coordinate axes,
    b. forming each of said radiation sensors from rechargeable, solid electrolyte, direct current batteries having a volume less than one-tenth of a cubic centimeter, and
    c. subjecting said solid electrolyte to said unknown amount of radiation and thereby partially ionizing said electrolyte to reduce battery terminal voltage in proportion to the amount of radiation passed therethrough.